No. 768,338. PATENTED AUG. 23, 1904.
E. K. NADEL.
RECEIPT FORM OR BLANK.
APPLICATION FILED OCT. 30, 1903.
NO MODEL.

STAR PUBLISHING COMPANY

Received of _Richard Roe_ for the _Daily and Sunday Star_ the amount of money represented in the extreme right hand corner, for the weeks designated by the individual attached stubs

ROUTE _6_

*Keep this receipt until you get another.*

| | | |
|---|---|---|
| 10 cents for week ending | AUG 15 1904 | AMOUNT PAID 10 |
| 10 cents for week ending | AUG 22 1904 | TOTAL PAID 20 |
| 10 cents for week ending | AUG 29 1904 | TOTAL PAID 30 |
| 10 cents for week ending | | TOTAL PAID 40 |
| 10 cents for week ending | | TOTAL PAID 50 |
| 10 cents for week ending | | TOTAL PAID 60 |
| 10 cents for week ending | | TOTAL PAID 70 |
| 10 cents for week ending | | TOTAL PAID 80 |
| 10 cents for week ending | | TOTAL PAID 90 |
| 10 cents for week ending | | TOTAL PAID 1— |

Route 6

Name _Richard Roe,_ _17 Broadway_

System 114

Entered _8/4_

Witnesses
E. J. Stewart
Paxton Morton

*Erwin K. Nadel,*
Inventor.

by C. A. Snow & Co.
Attorneys

No. 768,338.

Patented August 23, 1904.

UNITED STATES PATENT OFFICE.

ERWIN K. NADEL, OF ELKHART, INDIANA.

RECEIPT FORM OR BLANK.

SPECIFICATION forming part of Letters Patent No. 768,338, dated August 23, 1904.

Application filed October 30, 1903. Serial No. 179,196. (No model.)

*To all whom it may concern:*

Be it known that I, ERWIN K. NADEL, a citizen of the United States, residing at Elkhart, in the county of Elkhart and State of Indiana, have invented a new and useful Receipt Form or Blank, of which the following is a specification.

This invention relates to receipt forms or blanks; and the object thereof is to provide an improved receipt form or blank for use in receipting payments by instalments upon running accounts, so that the amount of matter to be entered on the receipt-blank to show each debit is reduced to a minimum, the total amount paid at any time shown by the receipt without the necessity of calculation, and the necessity of keeping other records of the transaction entirely obviated.

In attaining the object above stated I make use of the novel receipt form or blank hereinafter described, illustrated in the accompanying drawing, and particularly specified in the appended claim.

In the drawing there is shown a receipt-form upon which several entries have been made, but the account has not been closed.

Referring to the drawing, 1 designates the heading, which will preferably include at the top the name of the establishment issuing the receipt and will also include a statement of acknowledgment of the sums entered upon the receipt. The heading may also include a space for entering the route of the collector who receives the sums entered upon the receipt, as shown at 2. Below the heading there will preferably be placed on the receipt a sentence advising the retention of the receipt until computed, when another will be issued. A warning sentence is shown in the form illustrated at 3. At the other end of the receipt-blank is provided a heading arranged to be read with the receipt in inverse position. This heading 4 comprises blank spaces for the entry of the name and address of the person to whom the receipt is issued, as well as a blank for entering any other data which it is desired that the receipt shall show.

Between the headings 1 and 4 the receipt is divided transversely into a series of spaces 5, each of which is designed for the entry of a single debit, and in order that the receipt may be easily divided to separate the filled spaces from the unfilled spaces transverse lines 6 are provided between the several spaces. Each of the spaces 5 has in the left end, as seen in the drawing, a statement of the amount to be paid at each instalment, and at the opposite end is a statement of the total amount that will have become due after that space and the preceding spaces have been filled by entries. The intermediate portion of each space is left blank for the insertion therein of the date of a debit.

From the foregoing description it will be seen that in order to record a single debit in proper form upon the receipt it is only necessary to enter in the blank portion of the first space the date of the debit, and if the receipt is then torn upon the transverse line just below that space the total amount paid will be indicated by the matter in the right end of that space. Similarly, when several debits have been made the dates thereof will all be shown by the entries in several of the spaces, and the total paid will be shown by the matter at the right end of the space last filled.

It is intended that whenever a payment is made before a receipt form or blank is completely filled the receipt-form will be torn across immediately below the entry of the last debit, and the person making the payment will retain the upper portion of the receipt, while the lower portion will be returned to the establishment issuing it. In order that the portion of the receipt returned to the issuing establishment may show at a glance and without calculation how much has been paid, small figures in inverted position are placed in all of the spaces 5 but the first one and also immediately below the last space, these figures corresponding in each case to the figures in the space just preceding. When, therefore, the receipt-form is torn across on any one of the lines of division, the small figures in the space adjoining the line of tearing will indicate the amount of the payment, as shown in the last space on the portion of the receipt-form retained by the person making the payment.

In the receipt-form illustrated the payments are assumed to be made weekly, as is usually the case in paying subscriptions for newspapers received from carriers; but it is to be understood that the payments need not be made by the week or, indeed, at any definite intervals. If the payments are to be made monthly, the matter in the left end of each of the spaces 5 will be changed accordingly, and if the payments are not to be made at regular intervals, but each payment is to be of different size, the amount only of each payment will be printed in the left end of each of the spaces 5.

From the foregoing description and the drawing it will be easily seen that the improved receipt-form affords means for keeping accounts of small payments at intervals with a minimum of labor in entering the several payments, and whenever the sum due has been paid the receipt may be torn in two, one part being kept by the person making the payments and the other by the payee, and both sections of the receipt will show exactly the amount paid.

The stubs of the receipts returned to the payee when the payments cease may be filed and form a permanent record of all the transactions entered on the portion of the receipt retained by the person making the payments, the necessity of separate entries in record-books being thus completely obviated.

Having thus described the construction and use of my invention, what I claim as new, and desire to secure by Letters Patent, is—

A receipt form or blank provided at opposite ends with oppositely-disposed headings of suitable character and having the spaces between said headings divided by transversely-disposed lines into a plurality of spaces, each of said transversely-disposed spaces having a portion left blank and having in one end matter indicative of the amount of a single instalment and having in the other end matter indicative of the total amount paid including the instalment indicated in that division of the receipt, said receipt being also provided with figures arranged in all but the first of said spaces and immediately below the last space to indicate the totals paid including the instalments indicated in the spaces below which said figures appear, said figures being reversely disposed with reference to the other figures upon the receipt form or blank, in order that when the receipt is computed and the computed portion separated from the uncomputed, the portion of the receipt form or blank which is retained by the issuer thereof will show the total amount received thereon.

In testimony that I claim the foregoing as my own I have hereto affixed my signature in the presence of two witnesses.

ERWIN K. NADEL.

Witnesses:
A. P. KENT,
FRANK G. STAHR.